United States Patent [19]

Tateishi

[11] Patent Number: 5,539,590
[45] Date of Patent: Jul. 23, 1996

[54] FLOPPY DISK CONTROLLER ALLOWED TO DETECT STATUS CHANGE OF FLOPPY DISK DRIVER IN STANDBY MODE

[75] Inventor: Hisao Tateishi, Tokyo, Japan

[73] Assignee: NEC Corporation, Tokyo, Japan

[21] Appl. No.: 306,321

[22] Filed: Sep. 15, 1994

[30] Foreign Application Priority Data

Sep. 16, 1993 [JP] Japan ................................. 5-252155

[51] Int. Cl.⁶ ............................ G11B 15/18; G11B 21/02
[52] U.S. Cl. ................................................ 360/69; 360/75
[58] Field of Search ................................ 360/69, 71, 75

[56] References Cited

U.S. PATENT DOCUMENTS

| | | | |
|---|---|---|---|
| 4,479,154 | 10/1984 | Muramatsu | 360/69 |
| 4,635,145 | 1/1987 | Horie et al. | 360/69 X |
| 4,742,448 | 5/1988 | Sander et al. | 360/69 X |
| 4,933,785 | 6/1990 | Morehouse et al. | 360/78.04 |
| 5,204,788 | 4/1993 | Kasagi et al. | 360/67 |
| 5,301,293 | 4/1994 | Kano | 360/69 |
| 5,345,347 | 9/1994 | Hopkins et al. | 360/75 |
| 5,402,200 | 3/1995 | Shrinkle et al. | 360/69 |
| 5,473,589 | 12/1995 | Horie | 360/69 |

*Primary Examiner*—Aristotelis Psitos
*Assistant Examiner*—Regina Y. Neal
*Attorney, Agent, or Firm*—Foley & Lardner

[57] ABSTRACT

A floppy disk controller enters into a standby mode to reduce electric power consumption, and includes a standby controller which causes a floppy disk driver unit to report a status change to a recovery controller during the standby mode to recover the floppy disk controller to an active mode, thereby indicating the correct status of the floppy disk driver unit at all times.

7 Claims, 6 Drawing Sheets

FLOPPY DISK CONTROLLER ALLOWED TO DETECT STATUS CHANGE OF FLOPPY DISK DRIVER IN STANDBY MODE

FIELD OF THE INVENTION

This invention relates to a floppy disk controller and, more particularly, to a floppy disk controller which can detect a status change of a floppy disk driver unit in a standby mode.

DESCRIPTION OF THE RELATED ART

Typical examples of the floppy disk controller (FDC) commercially available are known as µPD765 and µPD2065 manufactured by NEC Corporation, and are introduced in "FDC Family User's Manual" published by NEC Corporation.

The prior art floppy disk controller monitors floppy disk driver units to see whether or not floppy disks are inserted into the floppy disk driver units, and reports the status of each floppy disk driver unit to a host computer.

FIG. 1 illustrates the arrangement of the prior art floppy disk controller 1, and a central processing unit 12 abbreviated as "CPU" which is incorporated in the prior art floppy disk controller 1 for controlling other components.

The prior art floppy disk controller 1 further comprises a program memory 3 implemented by a read only memory device for storing instruction codes, a program counter 4 for storing an address code indicative of an address in the program memory and a bus system 5 coupled to the central processing unit 2, the program memory 3 and the program counter 4 for transferring the address code and the instruction code therebetween.

The prior art floppy disk controller 1 further comprises an instruction decoder 6 coupled to the program memory 3 for decoding signals, an output port 7 coupled to the bus system 5 for supplying a selecting signal SEL to floppy disk driver units and an input port 8 responsive to a latch control signal LTC for latching status signals STS each indicative of the status of one of the floppy disk driver units. The instruction decoder 6 is described in detail later in connection with the standby mode. The central processing unit 2 produces the selecting signal SEL, and the selecting signal SEL is transferred through the bus system 5 to the output port 7. On the other hand, the status signals STS are transferred from the input port 8 through the bus system 5 to the central processing unit 2.

The prior art floppy disk controller 1 further comprises a standby controller responsive to a decoded signal CTL1 indicative of the standby mode for saving electric power consumed in the controller 1 and a host interface 10 communicable with the host computer. The host interface 10 supplies an interrupt request signal INT to the host computer, and a data bus signal DATA is transferred between the host computer an the host interface 10 for transferring information. The standby controller 9 produces an internal clock signal CLK from a system clock SYS supplied from the outside of the floppy disk controller 1, and distributes the internal clock signals CLK to other components. While the floppy disk controller is staying in the standby mode, the host computer releases the floppy disk controller 1 from the standby mode by using an instruction signal RL transferred through the host interface 10 to the standby controller 9.

The prior art floppy disk controller behaves as follows. FIG. 2 illustrates the sequence executed by the prior art floppy disk controller 1. First, the central processing unit 2 selects the first floppy disk driver unit as a target unit, and produces the selecting signal SEL indicative of the first floppy disk driver unit. The central processing unit 2 supplies the selecting signal SEL through the bus system 5 to the output port 7, and the selecting signal SEL is transferred from the output port 7 to the floppy disk driver units. The selecting signal SEL causes the first floppy disk driver unit to report the status, i.e., either loaded or unloaded state by using the status signal STS. In this instance, the first floppy disk driver unit is assumed to be continuously loaded with a floppy disk. The status signal STS of a high level indicative of the loaded state is supplied to the input port 8, and the input port 8 latches the status signal STS in synchronism with the latch control signal LTC at time t1. The status signal STS is transferred from the input port 8 to the central processing unit 2, and the central processing unit 2 acknowledges the unchanged status of the first floppy disk driver unit. For this reason, the interrupt request signal INT is maintained in an inactive low level.

The central processing unit 2 changes the selecting signal SEL from the first floppy disk driver unit to the second floppy disk driver unit, and the selecting signal SEL is transferred from the output port 7 to the second floppy disk driver. The second floppy disk driver unit is also in the loaded state, and the status is not changed. The status signal STS indicative of the loaded state is supplied from the second floppy disk driver unit to the input port 8, and is latched at time t2 in synchronism with the latch control signal LTC. The status signal STS indicative of the status of the second floppy disk driver unit is transferred from the input port 8 to the central processing unit 2, and the central processing unit 2 acknowledges that the second floppy disk driver unit is still loaded with a floppy disk.

The central processing unit 2 changes the selecting signal SEL from the second floppy disk driver unit to the third floppy disk driver unit, and the selecting signal SEL indicative of the third floppy disk driver unit is transferred from the output port 7 to the floppy disk drivers. A floppy disk is unloaded from the third floppy disk driver unit after the previous inquiry, and the status is changed from the loaded state to the unloaded state. The status signal STS indicative of the unloaded state is supplied from the third floppy disk driver unit to the input port 8, and is latched at time t3 in synchronism with the latch control signal LTC. The status signal STS indicative of the status of the third floppy disk driver unit is transferred from the input port 8 to the central processing unit 2, and the central processing unit 2 compares the current status with the previous status. Then, the central processing unit 2 acknowledges that the floppy disk is unloaded from the third floppy disk driver unit, and instructs the host interface 10 to change the interrupt request signal from the inactive level to the active level for reporting the status change to the host computer.

The central processing unit 2 changes the selecting signal SEL from the third floppy disk driver unit to the fourth floppy disk driver unit, and the selecting signal SEL indicative of the fourth floppy disk driver unit is transferred from the output port 7 to the floppy disk drivers. A floppy disk is loaded to the fourth third floppy disk driver unit after the previous inquiry, and the status is changed from the unloaded state to the loaded state. The status signal STS indicative of the loaded state is supplied from the fourth floppy disk driver unit to the input port 8, and is latched at time t4 in synchronism with the latch control signal LTC. The status signal STS indicative of the status of the fourth floppy disk driver unit is transferred from the input port 8 to the central processing unit 2, and the central processing unit 2 compares the current status with the previous status. Then, the central processing unit 2 acknowledges that the floppy disk is loaded into the fourth floppy disk driver unit, and instructs the host interface 10 to change the interrupt request signal from the inactive level to the active level for reporting the status change to the host computer.

Thus, the prior art floppy disk controller periodically inquires the status of each floppy disk driver unit, and changes the selecting signal SEL at intervals of 0.5 to 2.0 millisecond.

The personal computer is progressively scaled down, and reaches a book-shaped portable personal computer. The user sometimes uses the book-shaped portable personal computer only powered by a built-in battery unit, and user requests the manufacturer to prolong the time operable without an external power source.

For this reason, if the host computer does not access over a predetermined time period, the central processing unit causes the program memory 6 to supply an instruction code indicative of the standby mode to the decoder 6, and the standby controller 9 stops producing the internal clock signal CLK in response to the decoded signal CTL1. As a result, the prior art floppy disk controller 1 does not consume electric power, and the host interface 10 waits for the instruction signal RL for recovering the controller 1 from the standby mode.

However, a problem is encountered in the prior art floppy disk controller 1 in that a status change in the standby mode is not detectable, and write-in error and read-out error takes place after the recovery from the standby mode. In detail, if the decoded signal CTL1 is produced at time t4 (see FIG. 2), the central processing unit 2 maintains the selecting signal SEL in the inactive level, and the standby controller 9 stops the internal clock signal CLK. As a result, the prior art floppy disk controller 1 enters into the standby mode. Even if the user exchanges floppy disks at time t5 and t6, the central processing unit 2 can not detect the status changes of these floppy disk driver units, because the latch control signal LTC is never supplied to the input port 8. Accordingly, the host interface 10 does not request an interrupt to the host computer, and the host computer is not informed of the load/unload of floppy disks at time t5 and t6.

For this reason, if the host computer releases the prior art floppy disk controller from the standby mode at time t7 with the instruction signal RL, the prior art floppy disk controller 1 restarts the sequentially inquiry as if the floppy disk driver units kept the previous floppy disks.

SUMMARY OF THE INVENTION

It is therefore an important object of the present invention to provide a floppy disk controller which can detect a status change in the standby mode.

To accomplish the object, the present invention proposes to recover a floppy disk controller from standby mode when a floppy disk driver unit changes status thereof.

In accordance with the present invention, there is provided a floppy disk controller having at least an active mode for inquiring status of a floppy disk driver unit and a standby mode for saving electric power consumed therein, comprising: a) an output port coupled to the floppy disk driver unit for transferring an inquiring signal in the active mode; b) an input port coupled to the floppy disk driver unit for receiving a status signal indicative of current status of the floppy disk driver unit, the current status being changed depending upon an information storage medium loaded into and unloaded from the floppy disk driver unit; c) a supervisor operative to periodically produce the inquiry signal and compare the current status with previous status of the floppy disk driver unit to see whether or not the floppy disk driver unit changes the status in the active mode, the supervisor reporting a status change to a host computer when the floppy disk driver unit changes the status, the supervisor changing the operation mode from the active mode to the standby mode when the host computer is maintained without access for a predetermined time period, the supervisor producing an enable signal in the standby mode; d) an activating circuit responsive to the enable signal for producing the inquiring signal in the standby mode; and e) a recovery controller operative to monitor the status signal to see whether or not the floppy disk driver changes the status for changing the operation mode from the standby mode to the active mode, the recovery controller being further responsive to an instruction of the host computer for changing the operation mode from the standby mode to the active mode.

BRIEF DESCRIPTION OF THE DRAWINGS

The features and advantages of the floppy disk controller according to the present invention will be more clearly understood from the following description taken in junction with the accompanying drawings in which.

DESCRIPTION OF THE PREFERRED EMBODIMENTS

First Embodiment

Figure 1:
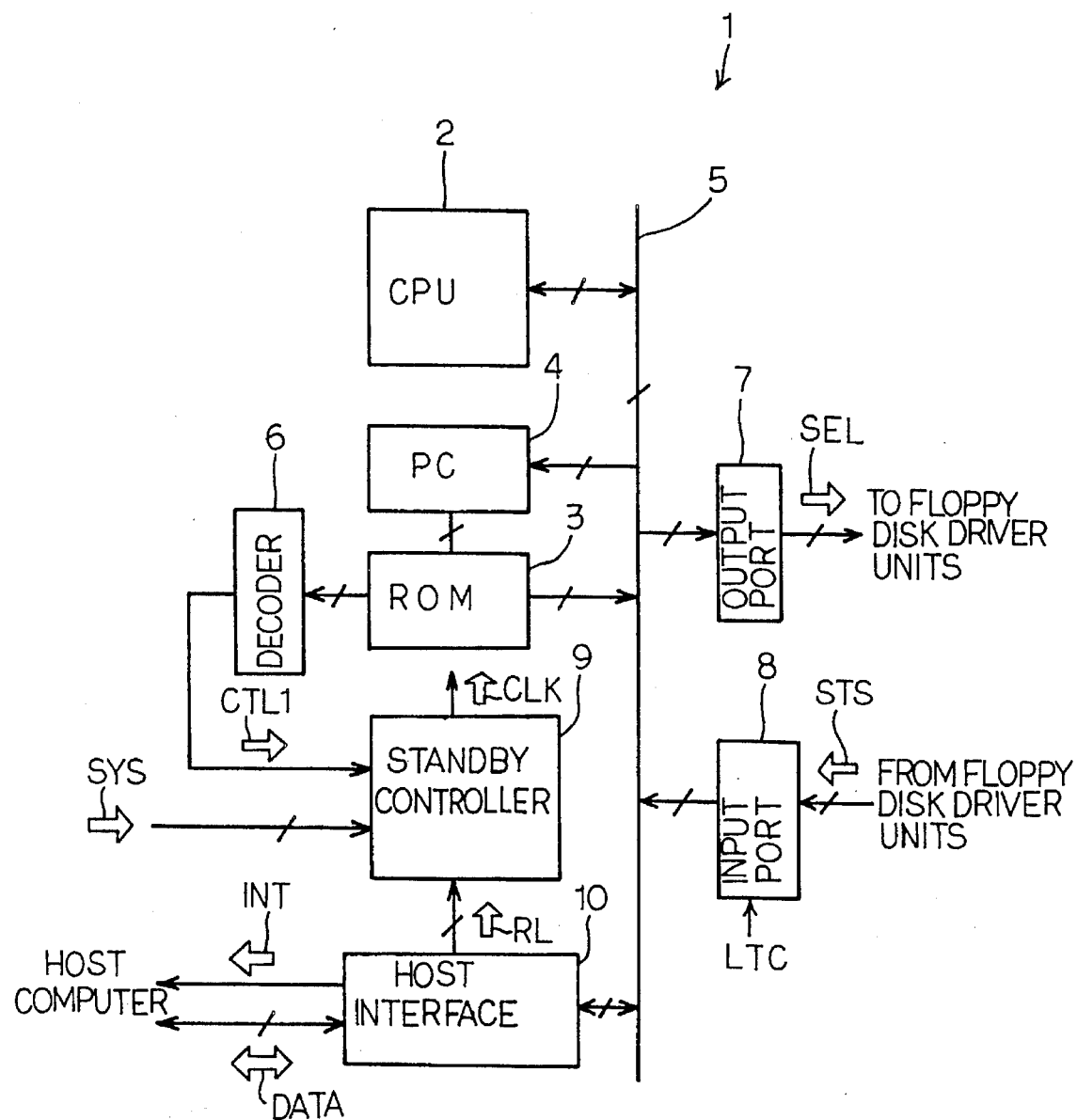
FIG. 1 is a block-diagram showing the arrangement of the prior art floppy disk controller.
Figure 2:
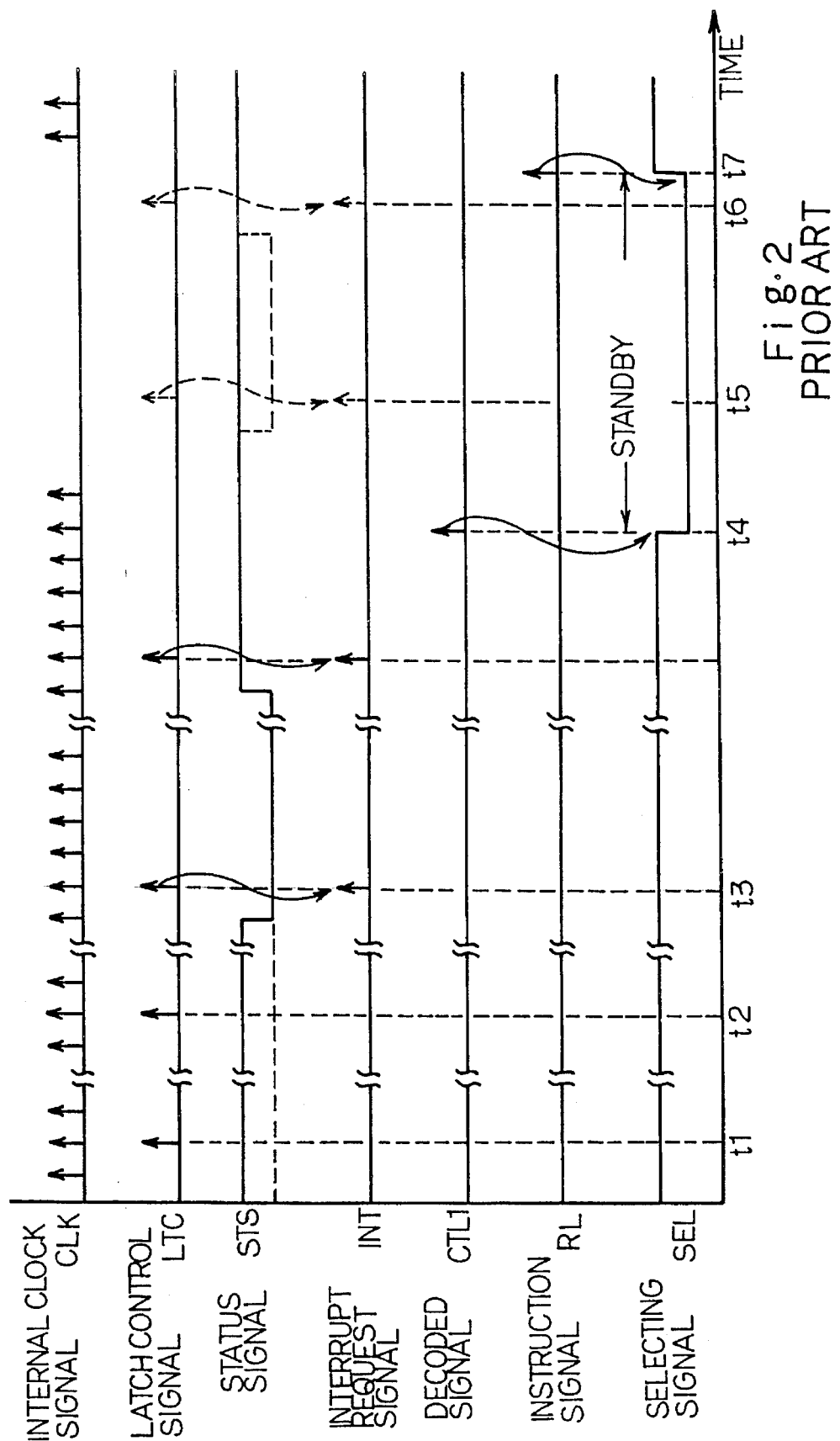
FIG. 2 is a timing chart showing the periodical inquiry executed by the prior art floppy disk controller.
Figure 3:
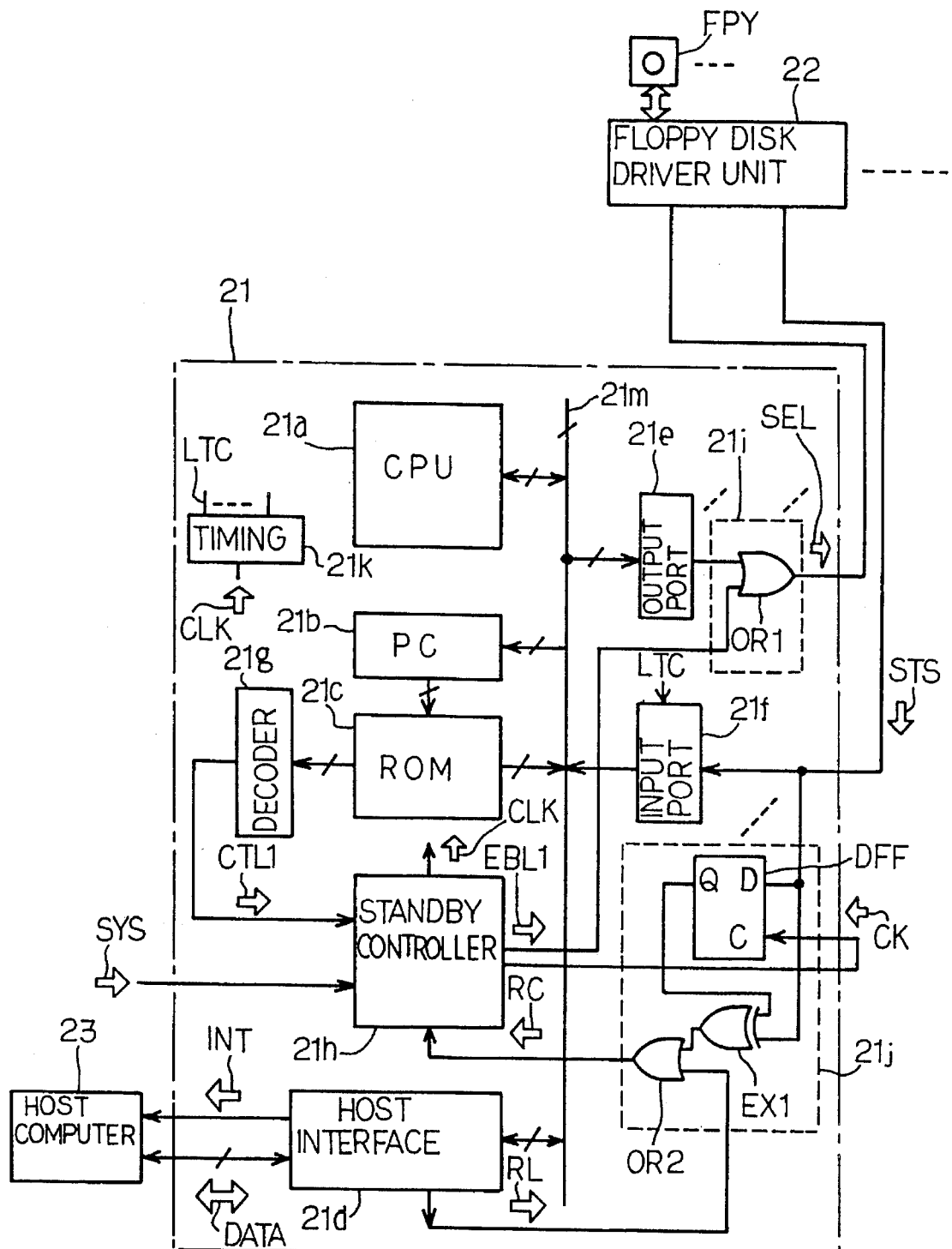
FIG. 3 is a block diagram showing the arrangement of a floppy disk controller according to the present invention.

Referring to FIG. 3 of the drawings, a floppy disk controller 21 embodying the present invention monitors a plurality of floppy disk driver units 22, and is communicable with a host computer 23. A floppy disk FPY is loaded into and unloaded from each of the floppy disk driver units 22 for writing and reading data bits.

The floppy disk controller 21 comprises a central processing unit 21a, a program counter 21b, a program memory 21c, a host interface 21d, an output port 21e, an input port 21f, a decoder 21g, a standby controller 21h, an activating circuit 21i, a recovery controller 21j and a timing controller 21k for producing various timing control signals such as a latch control signal LTC. The central processing unit 21a, the program counter 21b, the program memory 21c, the host interface 21d, the output port 21e and the input port 21f shares a bus system 21m, and communicate through the bus system 21m if necessary. Although only one floppy disk driver unit 22 is coupled to the activating circuit 21i and the recovery controller 21j, the floppy disk controller embodying the present invention controls the plurality of floppy disk driver units 22, and some components are multiplied. The floppy disk controller 21 enters into a standby mode if the host computer does not access for a predetermined time period, and is recovered from the standby mode to an active mode upon receiving a request from the host computer or a status change from the associated floppy disk driver units 22.

The central processing unit 21a sequentially fetches instruction codes stored in the addresses of the program memory 21c indicated by the program counter 21b, and executes the instruction codes for periodically inquiring the status of each floppy disk driver unit 22 and communicating with the host computer 23.

The decoder 21g decodes an instruction code indicative of the standby mode, and supplies an internal control signal CTL1 indicative of the standby mode to the standby controller 21h.

The standby mode controller 21h produces an internal clock signal CLK from a system clock signal SYS, and is responsive to the internal control signal CTL1 for saving electric power. Namely, when the internal control signal CTL1 is supplied to the standby controller 21h, the standby controller 21h stops the internal clock signal CLK, and changes an enable signal EBL1 to an active high level. The standby controller 21h further produces an auxiliary clock signal CK from the system clock SYS in the standby mode, and the auxiliary clock signal CK is supplied to the recovery controller 21j only. For this reason, the increment of electric power due to the auxiliary clock signal CK is negligible.

The internal clock signal CLK synchronizes at least central processing unit 21a, the program counter 21b and the host interface 21d with one another, and the output port 21e and the input port are also indirectly synchronized with the central processing unit 21a.

The standby controller 21h restarts the internal clock signal CLK and changes the enable signal EBL1 to an inactive low level in response to an instruction signal RC indicative of a recovery to the active mode. The instruction signal RC is supplied from the recovery controller 21j to the standby controller 21h.

The host interface 21d is under the control of the central processing unit 21a, and supplies an interrupt request signal INT and a data code DATA indicative of necessary information to the host computer 23. A status change of the floppy disk driver unit may be a piece of the necessary information. The host computer 23 supplies a data code DATA to the host interface 21d, and an instruction for recovery from the standby mode is represented by the data code DATA. In this instance, the central processing unit 21a, the program counter 21b, the program memory 21c, the decoder 21g, and the host interface 21d as a whole constitute a supervisor.

The central processing unit 21a supplies a selecting signal SEL to the output port 21e, and the output port 21e transfers the selecting signal SEL through the activating circuit 21i to the floppy disk driver units 22. The floppy disk driver units 22 are responsive to the selecting signal SEL for producing status signals STS each indicative of the present status of the floppy disk driver unit.

The activation circuit 21i is implemented by an OR gate OR1, and transfers the selecting signal SEL to the floppy disk driver units 22 in the active mode, because the enable signal EBL1 is maintained in the inactive low level. On the other hand, the selecting signal SEL is not produced in the standby mode, and the activating circuit 21i transfers the enable signal EBL1 to the floppy disk driver units 22 so that the floppy disk driver units 22 produces the status signals STS in the standby mode.

The input port 21f is responsive to the latch control signal LTC for storing the status signals STS, and each status signal STS is transferred to the central processing unit 21a. The central processing unit 21a stores the previous status of each floppy disk driver unit in the internal registers thereof, and compares the present status with the previous status to see whether or not the floppy disk FPY is loaded into or unloaded from the floppy disk driver unit after the previous inquiry. However, while the floppy disk controller is staying in the standby mode, the timing generator 21k does not produce the latch control signal LTC, and, for this reason, the input port 21f does not latch the status signals STS.

The recovery controller 21j comprises a delayed flip-flop circuit DFF, an exclusive-OR gate EX1 and an OR gate OR2, and the status signal STS is supplied to the data input node D of the delayed flip-flop DFF and one of the input nodes of the exclusive-OR gate EX1. The auxiliary clock signal CK is supplied to the clock node C of the delayed flip-flop DFF, and the current status is stored in the delayed flip flop DFF until the next inquiry. Therefore, the exclusive-OR gate EX1 monitors the status signal STS in the standby mode to see whether or not a status change takes place. If the floppy disk driver unit changes the status, the exclusive-OR gate EX1 causes the OR gate OR2 to produce the instruction signal RC indicative of the recovery from the standby mode.

The host interface 21d supplies the instruction signal RL indicative of the recovery from the standby mode to the OR gate OR2, and the OR gate OR2 produces the instruction signal RC from the request from the host computer 23 as well as the status change detected by the exclusive-OR gate EX1.

Figure 4:
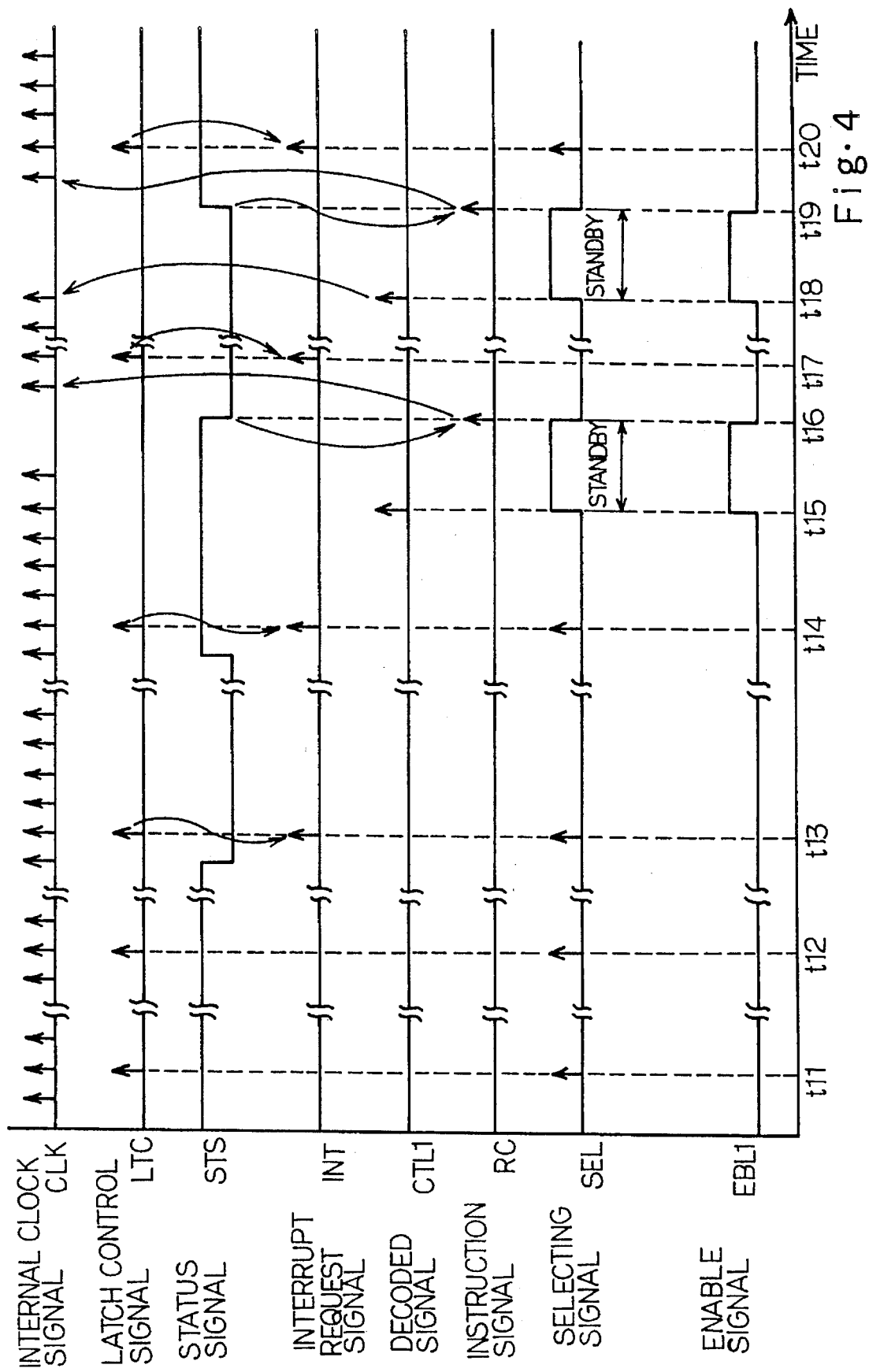
FIG. 4 is a timing chart showing a periodical inquiry executed by the floppy disk controller according to the present invention.

Description is hereinbelow made on the behavior of the floppy disk controller 21 with reference to FIG. 4. Assuming now that the floppy disk controller 21 is in the active mode, the central processing unit 21a supplies the selecting signal SEL indicative of the floppy disk driver unit 22 to the output port 21e at times t11 and t12, and the selecting signal SEL is transferred through the OR gate OR1 to the floppy disk driver unit 22. The floppy disk FPY is still loaded in the floppy disk driver unit 22 at times t11 and t12, and the status signal STS indicative of the loaded state is supplied from the floppy disk driver unit 22 to the input port 21f. The input port 21f latches the status signal STS in response to the latch control signal LTC, and the status signal STS is transferred to the central processing unit 21a. The central processing unit 21a compares the current status of the floppy disk driver unit 22 with the previous status, and acknowledges that no status change takes place. For this reason, the interrupt request signal INT is not produced at times t11 and t12.

The central processing unit 21a supplies the selecting signal SEL indicative of the floppy disk driver unit 22 to the output port 21e at time t13 again, and the selecting signal SEL is transferred through the OR gate OR1 to the floppy disk driver unit 22. A user has already removed the floppy disk FPY from the floppy disk driver unit 22 before time t13, and the floppy disk driver unit 22 changes the status signal STS from the loaded state to the unloaded state. The input port 21f latches the status signal STS in response to the latch control signal LTC, and transfers the status signal STS to the central processing unit 21a. The central processing unit 21a compares the current status, i.e., the unloaded state with the previous status, i.e., the loaded state, and notices that the status of the floppy disk driver unit 22 is changed. The central processing unit 21a instructs the host interface 21d to request an interrupt to the host computer 23, and the status change of the floppy disk driver unit 22 is reported to the host computer 22.

The central processing unit 21a supplies the selecting signal SEL indicative of the floppy disk driver unit 22 to the output port 21e at time t14 again, and the selecting signal SEL is transferred through the OR gate OR1 to the floppy disk driver unit 22. The user inserted a floppy disk FPY into the floppy disk driver unit 22 between time t13 and time t14, and the floppy disk driver unit 22 changes the status signal STS from the unloaded state to the loaded state. The input port 21f latches the status signal STS in response to the latch control signal LTC, and transfers the status signal STS to the central processing unit 21a. The central processing unit 21a compares the current status, i.e., the loaded state with the previous status, i.e., the unloaded state, and notices that the status of the floppy disk driver unit 22 is changed. The central processing unit 21a instructs the host interface 21d to request an interrupt to the host computer 23, and the status change of the floppy disk driver unit 22 is reported to the host computer 22.

The predetermined time period is expired without an access at time t15, and the central processing unit 21a supplies the address assigned to the instruction code for the standby mode to the program counter 21b. The instruction code for the standby mode is supplied to the decoder 21g, and decoder 21g produces the decoded signal CTL1 at time t15. The standby controller 21h stops the internal clock signal CLK, and changes the enable signal EBL1 to the active high level. Moreover, the standby controller produces the auxiliary clock signal CK from the system clock SYS, and supplies the auxiliary clock signal CK to the delayed flip-flop DFF only. The OR gate OR1 produces the selecting signal SEL from the enable signal EBL1, and supplies it to the floppy disk driver unit 22. While the floppy disk driver unit 22 is supplying the status signal STS indicative of the loaded state to the delayed flip flop DFF and the exclusive-OR gate EX1, the two inputs of the exclusive-OR gate EX1 are matched, and the exclusive-OR gate EX1 maintains the output node thereof in the low level. For this reason, the instruction signal RC remains in the inactive low level.

However, if the user removes the floppy disk FPY from the floppy disk driver unit 22 at time t16, the floppy disk driver unit 22 changes the status signal STS from the loaded state to the unloaded state, and the status signal STS becomes opposite in logic level to the output of the delayed flip flop DFF. As a result, the exclusive-OR gate EX1 changes the output thereof to the high level, and the OR gate OR2 shifts the instruction signal RC to the high level indicative of the recovery from the standby mode.

Then, the standby controller 21h restarts the internal clock signal CLK, and changes the enable signal EBL1 to the inactive low level. The standby controller 21h stops the auxiliary clock signal CK. The central processing unit 21a supplies the selecting signal SEL indicative of the floppy disk driver unit 22 to the output port 21e at time t17, and the selecting signal SEL is transferred through the OR gate OR1 to the floppy disk driver unit 22. The floppy disk driver unit 22 supplies the status signal STS of the low level indicative of the unloaded state to the input port 21f, and the input port 21f latches the status signal STS in response to the latch control signal LTC. The status signal STS is transferred to the central processing unit 21a, and the central processing unit 21a compares the current status, i.e., the unloaded state with the previous status, i.e., the loaded state. The central processing unit 21a acknowledges the status change, and instructs the host interface 21d to request an interrupt to the host computer 23 for reporting the status change of the floppy disk driver unit 22.

The predetermined time period is expired without an access again at time t18, and the central processing unit 21a supplies the address assigned to the instruction code for the standby mode to the program counter 21b. The instruction code for the standby mode is supplied to the decoder 21g, and decoder 21g produces the decoded signal CTL1. The standby controller 21h stops the internal clock signal CLK, and changes the enable signal EBL1 to the active high level again. Moreover, the standby controller 21h produces the auxiliary clock signal CK from the system clock SYS, and supplies the auxiliary clock signal CK to the delayed flip-flop DFF only. The OR gate OR1 produces the selecting signal SEL from the enable signal EBL1, and supplies it to the floppy disk driver unit 22. While the floppy disk driver unit 22 is supplying the status signal STS indicative of the unloaded state to the delayed flip flop DFF and the exclusive-OR gate EX1, the two inputs of the exclusive-OR gate EX1 are matched, and the exclusive-OR gate EX1 maintains the output node thereof in the low level. For this reason, the instruction signal RC remains in the inactive low level.

However, if the user inserts a floppy disk FPY into the floppy disk driver unit 22 at time t19, the floppy disk driver unit 22 changes the status signal STS from the unloaded state to the loaded state, and the status signal STS becomes opposite in logic level to the output of the delayed flip flop DFF. As a result, the exclusive-OR gate EX1 changes the output thereof to the high level, and the OR gate OR2 shifts the instruction signal RC to the high level indicative of the recovery from the standby mode.

Then, the standby controller 21h restarts the internal clock signal CLK, and changes the enable signal EBL1 to the inactive low level. The standby controller 21h stops the auxiliary clock signal CK. The central processing unit 21a supplies the selecting signal SEL indicative of the floppy disk driver unit 22 to the output port 21e at time t20, and the selecting signal SEL is transferred through the OR gate OR1 to the floppy disk driver unit 22. The floppy disk driver unit 22 supplies the status signal STS indicative of the loaded state to the input port 21f, and the input port 21f latches the status signal STS in response to the latch control signal LTC. The status signal STS is transferred to the central processing unit 21a, and the central processing unit 21a compares the current status, i.e., the loaded state with the previous status, i.e., the unloaded state. The central processing unit 21a acknowledges the status change, and instructs the host interface 21d to request an interrupt to the host computer 23 for reporting the status change of the floppy disk driver unit 22.

As will be understood from the foregoing description, the recovery controller monitors the status signal to see whether or not a status change takes place in the standby mode, and causes the floppy disk controller to recover from the standby mode to the active mode upon detection of the status change. For this reason, the status information in the host computer is updated at all times, and a write-in error and a read-out error never take place.

Second Embodiment

Figure 5:
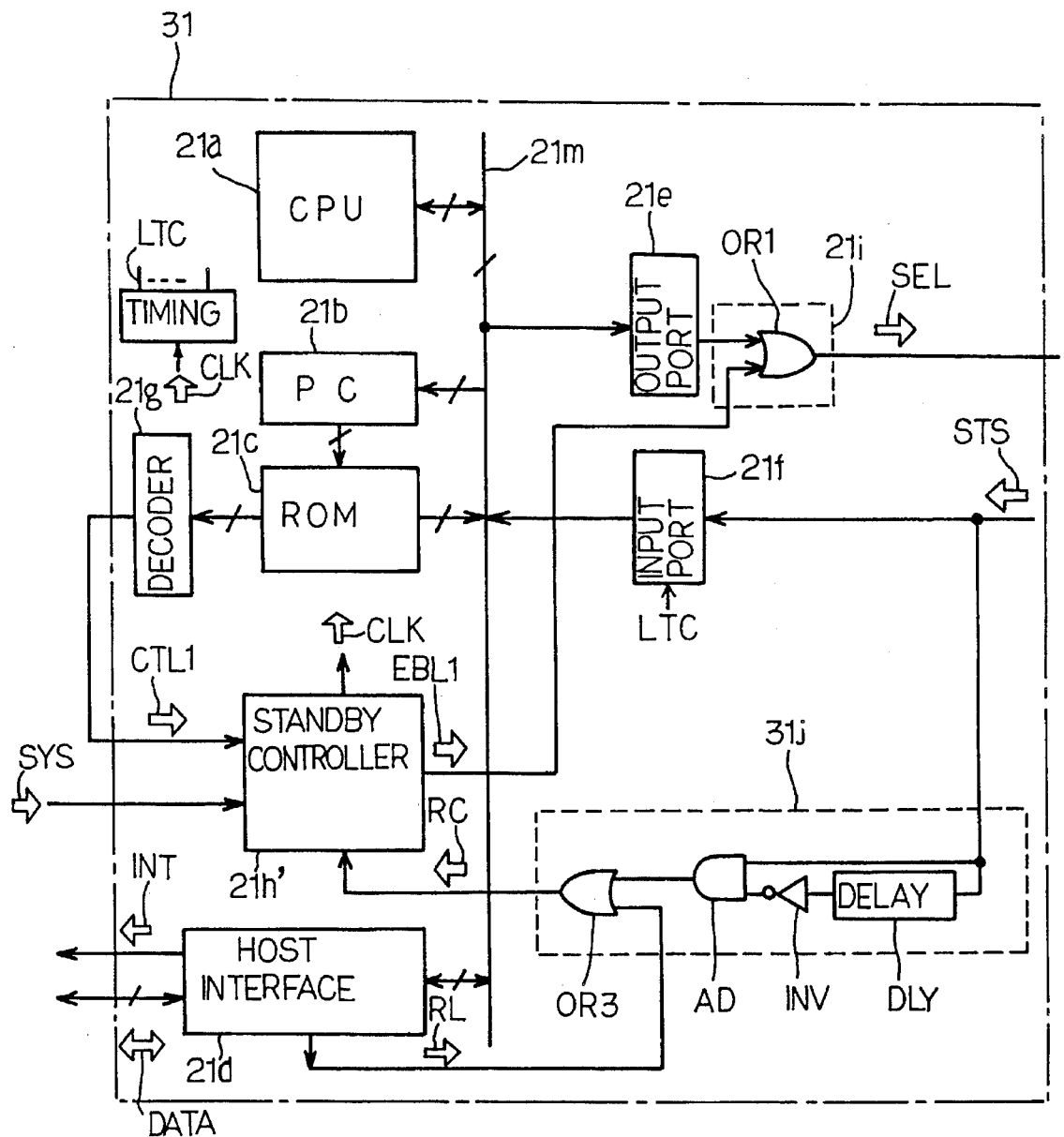
FIG. 5 is a block diagram showing the arrangement of another floppy disk controller according to the present invention.

Turning to FIG. 5 of the drawings, another floppy disk controller 31 embodying the present invention is illustrated. The floppy disk controller 31 implementing the second embodiment is similar in arrangement to the first embodiment except for a recovery controller 31j, and, for this reason, description is focused on the recovery controller 31j only. The other components are labeled with the same references designating corresponding components of the first embodiment without detailed description.

The recovery controller 31j comprises a delay circuit DLY for producing a delayed status signal, an inverter INV coupled to the output node of the delay circuit DLY, an AND gate AD having a first input node supplied with the status signal STS and a second input node supplied with the complementary signal of the delayed status signal and an OR gate OR3 having a first input node coupled to the output node of the AND gate AD and a second input node coupled to the host interface 21d.

If a new floppy disk is inserted into the floppy disk driver unit 22 in the standby mode, the previous status is unloaded state indicated by the low level, and the current status is loaded state indicated by the high level. Therefore, the complementary signal is in the high level, and is ANDed with the status signal STS of the high level. Then, the AND gate AD produces the high level signal, and the OR gate OR3 supplies the instruction signal for recovery to the active mode to the standby controller 21h.

Thus, when a floppy disk is loaded into the floppy disk driver unit, the recovery controller 31j instructs the standby controller 21h to restart the internal clock signal CLK and change the enable signal EBL1 to the inactive level. However, the status change from the loaded state to the unloaded state is not detectable.

Figure 6:
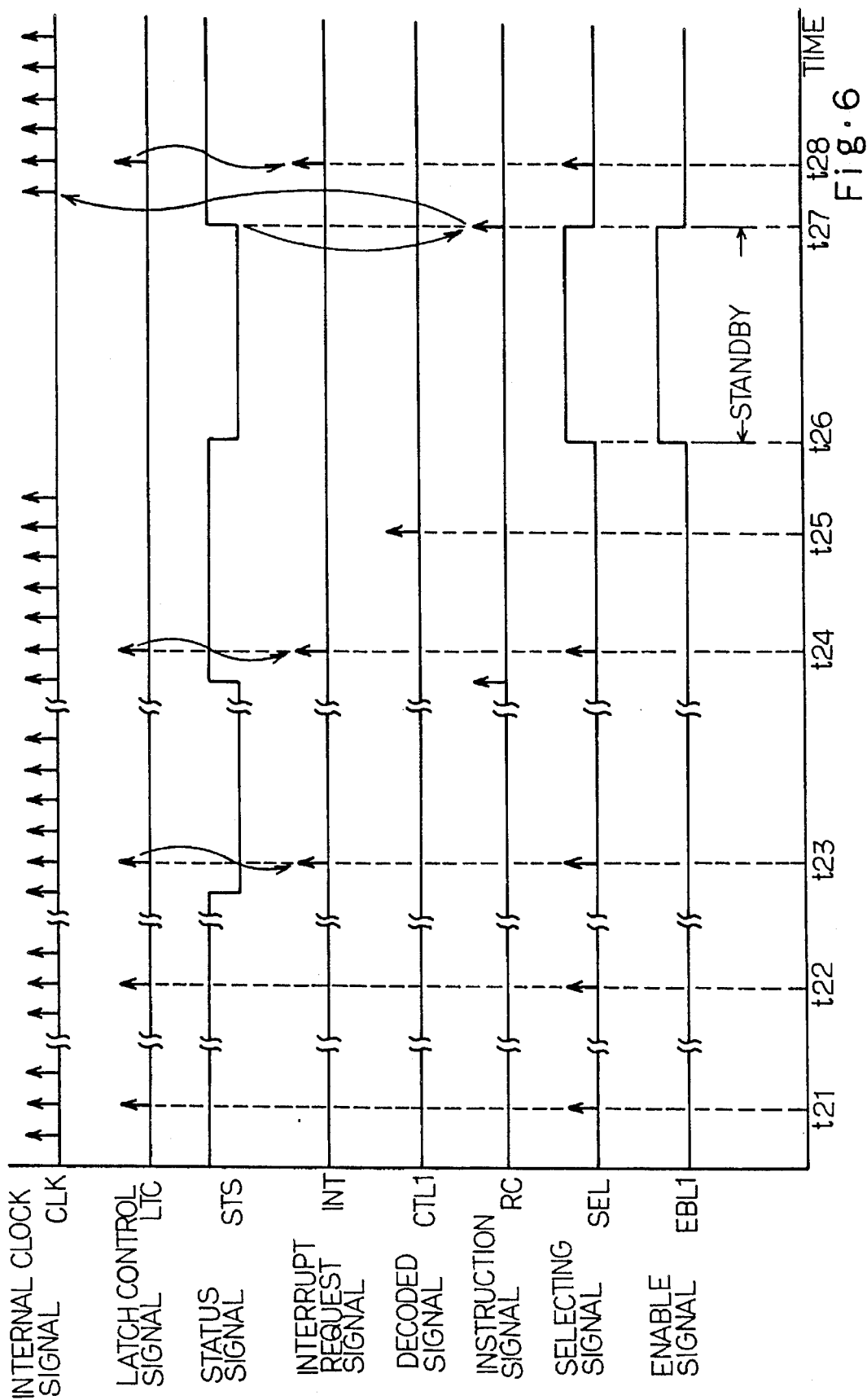
FIG. 6 is a timing chart showing a periodical inquiry executed by the floppy disk controller according to the present invention.

The behavior of floppy disk controller 31 with reference to FIG. 6 is described as follows. Assuming now that the floppy disk controller 31 is in the active mode, the central processing unit 21a supplies the selecting signal SEL indicative of the floppy disk driver unit 22 to the output port 21e at times t21 and t22, and the selecting signal SEL is transferred through the OR gate OR1 to the floppy disk driver unit 22. The floppy disk FPY is still loaded in the floppy disk driver unit 22 at times t21 and t22, and the status signal STS indicative of the loaded state is supplied from the floppy disk driver unit 22 to the input port 21f. The input port 21f latches the status signal STS in response to the latch control signal LTC, and the status signal STS is transferred to the central processing unit 21a. The central processing unit 21a compares the current status of the floppy disk driver unit 22 with the previous status, and acknowledges that no status change takes place. For this reason, the interrupt request signal INT is not produced at times t21 and t22.

The central processing unit 21 a supplies the selecting signal SEL indicative of the floppy disk driver unit 22 to the output port 21e at time t23 again, and the selecting signal SEL is transferred through the OR gate OR1 to the floppy disk driver unit 22. A user has already removed the floppy disk FPY from the floppy disk driver unit 22 before time t23, and the floppy disk driver unit 22 changes the status signal STS from the loaded state to the unloaded state. The input port 21f latches the status signal STS in response to the latch control signal LTC, and transfers the status signal STS to the central processing unit 21a. The central processing unit 21a compares the current status, i.e., the unloaded state with the previous status, i.e., the loaded state, and notices that the status of the floppy disk driver unit 22 is changed. The central processing unit 21a instructs the host interface 21d to request an interrupt to the host computer 23, and the status change of the floppy disk driver unit 22 is reported to the host computer 22.

The central processing unit 21 a supplies the selecting signal SEL indicative of the floppy disk driver unit 22 to the output port 21e at time t24 again, and the selecting signal SEL is transferred through the OR gate OR1 to the floppy disk driver unit 22. The user inserted a floppy disk FPY into the floppy disk driver unit 22 between time t23 and time t24, and the floppy disk driver unit 22 changes the status signal STS from the unloaded state to the loaded state. The input port 21f latches the status signal STS in response to the latch control signal LTC, and transfers the status signal STS to the central processing unit 21a. The central processing unit 21a compares the current status, i.e., the loaded state with the previous status, i.e., the unloaded state, and notices that the status of the floppy disk driver unit 22 is changed. The central processing unit 21a instructs the host interface 21d to request an interrupt to the host computer 23, and the status change of the floppy disk driver unit 22 is reported to the host computer 22.

The predetermined time period is expired without an access at time t25, and the central processing unit 21a supplies the address assigned to the instruction code for the standby mode to the program counter 21b. The instruction code for the standby mode is supplied to the decoder 21g, and decoder 21g produces the decoded signal CTL1. The standby controller 21h' stops the internal clock signal CLK, and changes the enable signal EBL1 to the active high level. The OR gate OR1 produces the selecting signal SEL from the enable signal EBL1, and supplies it to the floppy disk driver unit 22 at time t26.

Even if the user removes the floppy disk FPY from the floppy disk driver unit 22, the recovery controller 31j ignores the status change, and the floppy disk controller 31 is staying in the standby mode. The status signal STS of the low level is stored in the delay circuit DLY, and the inverter INV supplies the high level to the AND gate AD.

If the user inserts a floppy disk FPY into the floppy disk driver unit 22 at time t27, the floppy disk driver unit 22 changes the status signal STS from the unloaded state to the loaded state, and the status signal STS of the high level is ANDed with the high level signal of the inverter INV. As a result, the AND gate AD changes the output thereof to the high level, and the OR gate OR2 shifts the instruction signal RC to the high level indicative of the recovery from the standby mode.

Then, the standby controller 21h' restarts the internal clock signal CLK, and changes the enable signal EBL1 to the inactive low level. The central processing unit 21a supplies the selecting signal SEL indicative of the floppy disk driver unit 22 to the output port 21e at time t28, and the selecting signal SEL is transferred through the OR gate OR1 to the floppy disk driver unit 22. The floppy disk driver unit 22 supplies the status signal STS indicative of the loaded state to the input port 21f, and the input port 21f latches the status signal STS in response to the latch control signal LTC. The status signal STS is transferred to the central processing unit 21a, and the central processing unit 21a acknowledges the status change, and instructs the host interface 21d to request an interrupt to the host computer 23 for reporting the status change of the floppy disk driver unit 22.

As will be understood from the foregoing description, the recovery controller 31j monitors the status signal STS to see whether or not a new floppy is loaded into the floppy disk driver unit 22 in the standby mode, and causes the floppy disk controller 31 to recover from the standby mode to the active mode. For this reason, the status information in the host computer is updated at all times, and a write-in error and a read-out error never take place.

The recovery controller 31j does not need the auxiliary clock signal CK, and the power consumption is further improved.

Although the recovery controller 31j does not respond to the status change from the loaded state to the unloaded state, a user does not always insert a new floppy, and the ignorer hardly results in the write-in error and read-out error. On the other hand, when a new floppy disk is loaded, the user accesses or writes data at high probability. For this reason, the recovery controller 31j is effective against the write-in error and the read-out error.

Although particular embodiments of the present invention have been shown and described, it will be obvious to those skilled in the art that various changes and modifications may be made without departing from the spirit and scope of the present invention.

What is claimed is:

1. A floppy disk controller having at least an active mode for inquiring a status of a floppy disk driver unit and a standby mode for saving electric power consumed therein, comprising:

a) an output port coupled to said floppy disk driver unit for transferring an inquiring signal in said active mode;

b) an input port coupled to said floppy disk driver unit for receiving a status signal indicative of a current status of said floppy disk driver unit, said current status being changed depending upon whether an information storage medium is loaded into or unloaded from said floppy disk driver unit;

c) a controlling unit operative to periodically produce said inquiring signal and compare said current status with a previous status of said floppy disk driver unit to see whether or not said floppy disk driver unit changes the status in said active mode, said controlling unit reporting a status change to a host computer when said floppy disk driver unit changes the status, said controlling unit changing an operation mode of said floppy disk controller from said active mode to said standby mode when said host computer does not access said floppy disk controller for a predetermined time period, said controlling unit producing an enable signal in said standby mode;

d) an activating circuit responsive to said enable signal for producing said inquiring signal in said standby mode; and e) a recovery controller, operative to monitor said status signal to see whether or not said floppy disk driver unit changes the status, for changing said operation mode from said standby mode to said active mode, said recovery controller being further responsive to an instruction from said host computer for changing said operation mode from said standby mode to said active mode.

2. The floppy disk controller as set forth in claim 1, in which said controlling unit comprises:

c-1) a central processing unit, operative to sequentially fetch instruction codes so as to execute a program sequence, for producing said inquiring signal, a first program sequence for detecting said status change, a second program sequence for producing an instruction for an interrupt request, a third program sequence for reporting said status change and a fourth program sequence for tracking said predetermined time period in said active mode, c-2) a program memory having a plurality of addresses for storing instruction codes, and sequentially supplying said instruction codes to said central processing unit in said active mode, c-3) a program counter selectively designating said addresses under the control of said central processing unit for allowing said central processing unit to sequentially fetch said instruction codes in said active mode, c-4) a decoder coupled to said program counter for producing a decoded signal from one of said instruction codes in said active mode when said central processing unit determines that said predetermined time period has expired, c-5) a host interface, responsive to the instruction from said central processing unit, for producing an interrupt request signal and a data code for reporting said status change to said host computer, said host interface being further responsive to said instruction from said host computer for requesting said recovery controller to change the operation mode from said standby mode to said active mode, and c-6) a standby controller responsive to said decoded signal in said active mode for stopping an internal clock signal and producing said enable signal and an auxiliary clock signal, said internal clock signal synchronizing said central processing unit, said program counter, said host interface, said output port and said input port to one another, said standby controller being further responsive to an instruction signal from said recovery controller for restarting said internal clock signal and stopping said enable signal and said auxiliary clock signal.

3. The floppy disk controller as set forth in claim 2, in which said activating circuit is implemented by an OR gate having a first input node coupled to said output port, a second input node coupled to said standby controller for receiving said enable signal and an output node for supplying said inquiring signal to said floppy disk driver unit.

4. The floppy disk controller as set forth in claim 2, in which said recovery controller comprises:

e-1) a delayed flip flop having a data node supplied with said status signal and a clock node supplied with said auxiliary clock signal for storing said status signal in response to said auxiliary clock signal, e-2) an exclusive-OR gate having a first input node coupled to an output node of said delayed flip flop and a second input node supplied with said status signal, and e-3) an OR gate having a first input node coupled to an output node of said exclusive-OR gate and a second input node coupled to said host interface for receiving said instruction from said host computer.

5. The floppy disk controller as set forth in claim 1, in which said controlling unit comprises:

c-1) a central processing unit, operative to sequentially fetch instruction codes so as to execute a program sequence, for producing said inquiring signal, a first program sequence for detecting said status change, a second program sequence for producing an instruction for an interrupt request, a third program sequence for reporting said status change and a fourth program sequence for tracking said predetermined time period in said active mode, c-2) a program memory having a plurality of addresses for storing instruction codes, and sequentially supplying said instruction codes to said central processing unit in said active mode, c-3) a program counter selectively designating said addresses under the control of said central processing unit for allowing said central processing unit to sequentially fetch said instruction codes in said active mode, c-4) a decoder coupled to said program counter for producing a decoded signal from one of said instruction codes in said active mode when said central processing unit determines that said predetermined time period has expired, c-5) a host interface, responsive to the instruction from said central processing unit, for producing an interrupt request signal and a data code for reporting said status change to said host computer, said host interface being further responsive to said instruction from said host computer for requesting said recovery controller to change the operation mode from said standby mode to said active mode, and c-6) a standby controller responsive to said decoder signal in said active mode for stopping an internal clock signal and producing said enable signal, said internal clock signal synchronizing said central processing unit, said program counter, said host interface, said output port and said input port to one another, said standby controller being further responsive to an instruction signal from said recovery controller for restarting said internal clock signal and stopping said enable signal.

6. The floppy disk controller as set forth in claim 5, in which said activating circuit is implemented by an OR gate having a first input node coupled to said output port, a second input node coupled to said standby controller for receiving said enable signal and an output node for supplying said inquiring signal to said floppy disk driver unit.

7. The floppy disk controller as set forth in claim 5, in which said recovery controller comprises:

e-1) a delay circuit supplied with said status signal for producing a delayed status signal, e-2) an inverter coupled to an output node of said delay circuit for producing a complementary signal of said delayed status signal, e-3) an AND gate supplied with said status signal and said complementary signal, and e-3) an OR gate having a first input node coupled to an output node of said AND gate and a second input node coupled to said host interface for receiving said instruction from said host computer.

* * * * *